(12) United States Patent
Bonev

(10) Patent No.: US 12,024,373 B1
(45) Date of Patent: Jul. 2, 2024

(54) SYSTEM TO MOVE OBJECTS IN A CIRCLE

(71) Applicant: Jordan Bonev, Haworth, NJ (US)

(72) Inventor: Jordan Bonev, Haworth, NJ (US)

( * ) Notice: Subject to any disclaimer, the term of this patent is extended or adjusted under 35 U.S.C. 154(b) by 0 days.

(21) Appl. No.: 18/405,041

(22) Filed: Jan. 5, 2024

(51) Int. Cl.
*B65G 47/80* (2006.01)
*F16H 21/48* (2006.01)

(52) U.S. Cl.
CPC ............. *B65G 47/80* (2013.01); *F16H 21/48* (2013.01)

(58) Field of Classification Search
CPC ................................ B65G 47/80; F16H 21/48
See application file for complete search history.

(56) References Cited

U.S. PATENT DOCUMENTS

| | | |
|---|---|---|
| 1,755,720 A | 4/1930 | Winkler et al. |
| 2,739,811 A | 3/1956 | Persons |
| 3,080,956 A | 3/1963 | Salzmann |
| 3,223,224 A | 12/1965 | Fotsch et al. |
| 3,884,369 A | 5/1975 | Tomlinson |
| 3,927,883 A | 12/1975 | Bosley et al. |
| 4,130,194 A | 12/1978 | Schindel et al. |
| 4,169,334 A | 10/1979 | Breslow et al. |
| 6,050,034 A | 4/2000 | Krinner |
| 6,085,432 A | 7/2000 | Van der Sluis et al. |
| 7,258,222 B2 | 8/2007 | Marti Sala et al. |
| 8,763,852 B2 | 7/2014 | Dikken |
| 10,890,921 B2 | 1/2021 | Gillett |
| 2006/0124569 A1 | 6/2006 | Parkins |
| 2007/0029269 A1 | 2/2007 | Parkins |

FOREIGN PATENT DOCUMENTS

| | | | |
|---|---|---|---|
| EP | 735297 A1 * | 10/1996 | ............. F16H 21/48 |
| WO | 9705350 A1 | 2/1997 | |

* cited by examiner

*Primary Examiner* — Terence Boes
(74) *Attorney, Agent, or Firm* — Dunlap Bennett & Ludwig, PLLC; Anna L. Kinney

(57) ABSTRACT

A system to enable an object to move in a circular motion while keeping an upright position of the object intact includes a base, and a motor disposed on the base. The system further includes an enclosure configured to be attached to the motor, and a bearing wheel attached to the enclosure. The system additionally includes an up arm attached to the bearing wheel, and a holding arm attached to the up arm. The holding arm includes an attachment point to which the object is configured to be attached. The motor is configured to move the object in the circular motion by causing the up arm and the holding arm to move in the circular motion when the motor is switched ON.

10 Claims, 4 Drawing Sheets

SYSTEM TO MOVE OBJECTS IN A CIRCLE

BACKGROUND OF THE INVENTION

Field of the Invention

The present invention generally relates to a system for moving objects in a circle, and more particularly to a system for moving objects in a circle while keeping their vertical positions intact.

Description of the Related Art

There are many known application areas that require moving objects in a circle while keeping their vertical positions intact. For example, such object movement is required in a Ferris wheel where the enclosures/consoles move in a circle while their vertical positions remain intact for the safety of the occupants.

In a conventional Ferris wheel, the consoles freely hang and rely on gravity to maintain their upright positions or use motors to compensate for the tilt while rotating in the circle. While using gravity to maintain the upright position is simple, it is not a stable method. Further, using motors to compensate for the tilt may be a stable method; however, it is not a simple method.

Therefore, a system is required that enables an object to move in a circle while preserving its vertical and horizontal orientation in a simple and stable manner.

SUMMARY OF THE INVENTION

The following presents a simplified summary of the present disclosure in a simplified form as a prelude to the more detailed description that is presented herein.

In accordance with embodiments of the invention, there is provided a two degree of freedom (DOF) system to enable an object to move in a circular motion while keeping an upright position of the object intact. The system may be a three-linkage, motorized apparatus that includes a base, and an electrically controlled motor disposed on the base. The motor may be rigidly mounted to the base such that it bears much of the supporting forces of the system. The kinematics of the apparatus results in a 2-dimensional planar, circular motion of an attached object with a fixed vertical and horizontal orientation in space. The system further includes an enclosure configured to be attached to the motor, and a bearing wheel, or self-aligning bearing center, attached to the enclosure. The bearing may rotate off-axis from the motor, resulting in 3 DOF. The system additionally includes an up arm attached to the bearing wheel, and a holding arm attached to the up arm, forming a 90° linkage. The holding arm includes an attachment point to which the object is configured to be attached. The motor is configured to move the object in the circular motion by causing the up arm and the holding arm to move in the circular motion when the motor is switched ON. The 90° linkage may also be attached to two pin-supports on a second linkage attached to bearing yokes, which removes a rotational DOF and an x-axis DOF. A final linkage attached to the base by way of a bearing reintroduces the x-axis DOF.

The materials of manufacture are not particularly limited. In some embodiments, the base may be metal making the base even more sturdy. In some embodiments, the up arm and/or the holding arm may also be metal.

In some aspects, a top portion of the up arm is attached to a proximal portion of the holding arm. Further, the attachment point is disposed at the proximal portion of the holding arm.

The system may further include a yoke and a lower bearing. The yoke may have a U-shaped structure and may be attached to the base via the lower bearing. The bearing may have axial motion off-set from the motor. The bearing may be fixed to the base.

The system may further include one or more cross bars. In some aspects, a distal portion of the holding arm may be attached to the yoke via the cross bars.

Furthermore, the motor may be disposed a predefined distance away from a longitudinal axis of the holding arm. In some aspects, the motor may be at least one of a Direct Current (DC) motor, an Alternating Current (AC) motor, a stepper motor, and a servo motor.

The present disclosure discloses a simple and stable system that enables an object to move in a circle while keeping its vertical position intact. Any object can simply be screwed to the system, and the system will keep the object in its upright position while moving it in a circle. The object may be firmly attached to the system without requiring any extra mechanical gear or motors.

It is known that gravity cannot stably keep an object in an upright position when the object may be moving in a circle. Further, using extra motors to keep the objects in the upright position is a complicated and expensive approach. The system disclosed in the present disclosure provides a stable and simple approach to move an object in a circle while keeping its vertical/upright position intact.

These and other features, aspects, and advantages of the present invention will become better understood with reference to the following description and appended claims.

BRIEF DESCRIPTION OF THE DRAWINGS

Illustrative embodiments of the present invention are described herein with reference to the accompanying drawings, in which.

DETAILED DESCRIPTION OF INVENTION

Figure 1:
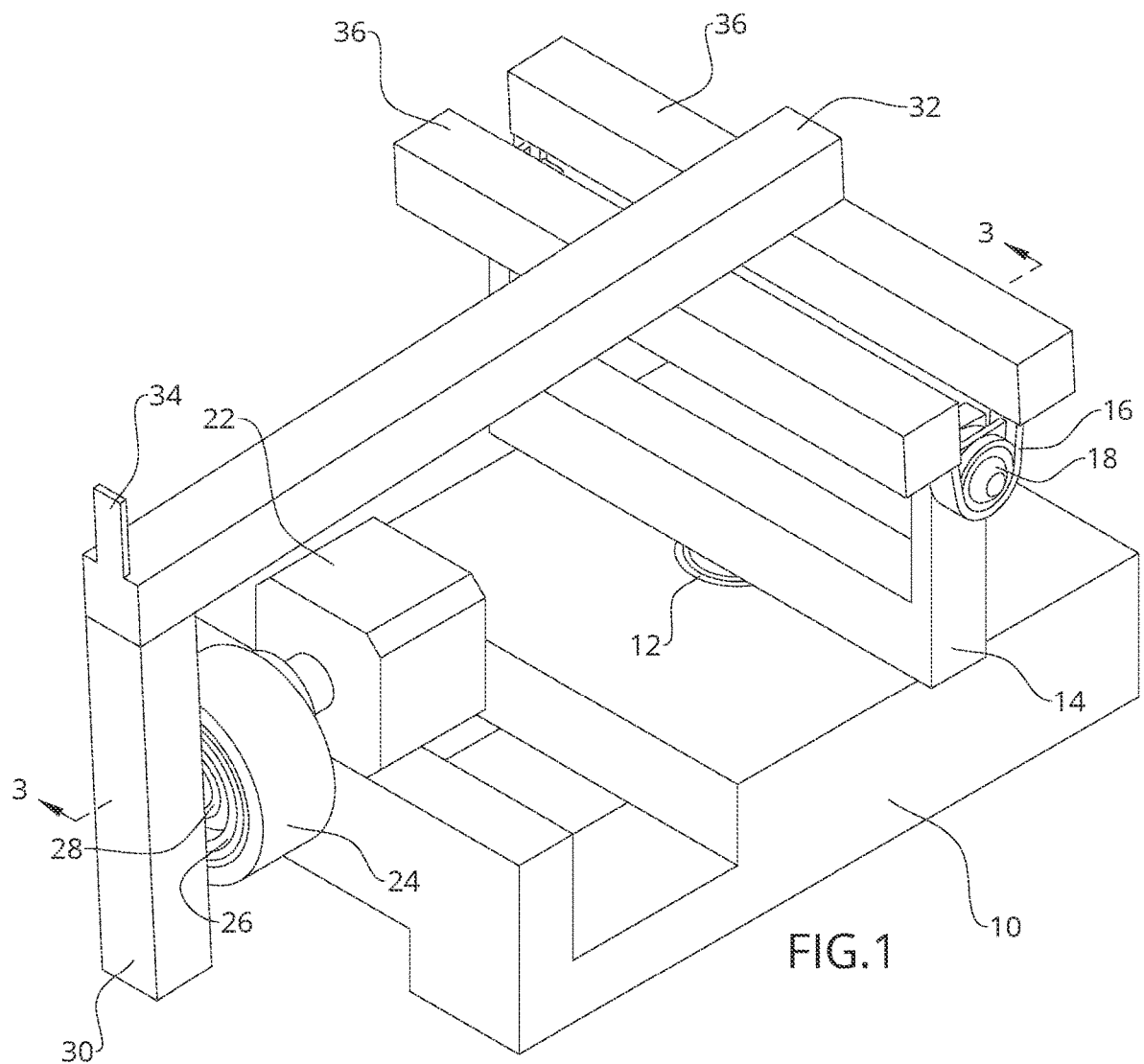
FIG. 1 depicts a perspective view of a system to move an object in a circle in accordance with embodiments of the invention.

For a further understanding of the nature and function of the embodiments, reference should be made to the following detailed description. Detailed descriptions of the embodiments are provided herein, as well as, the best mode of carrying out and employing the present invention. It will be readily appreciated that the embodiments are well adapted to carry out and obtain the ends and features mentioned as well as those inherent herein. It is to be understood, however, that the present invention may be embodied in various forms. Therefore, persons of ordinary skill in the art will realize that the following disclosure is illustrative only and not in any way limiting, as the specific details disclosed herein provide a basis for the claims and a representative basis for teaching to employ the present invention in virtually any appropriately detailed system, structure or manner. It should be understood that the devices, materials, methods, procedures, and techniques described herein are presently representative of various embodiments. Other embodiments of the disclosure will readily suggest themselves to such skilled persons having the benefit of this disclosure.

Reference will now be made in detail to the present preferred embodiments of the invention, examples of which are illustrated in the accompanying drawings. Wherever possible, the same reference numerals are used in the drawings and the description to refer to the same or like parts.

Figure 2:
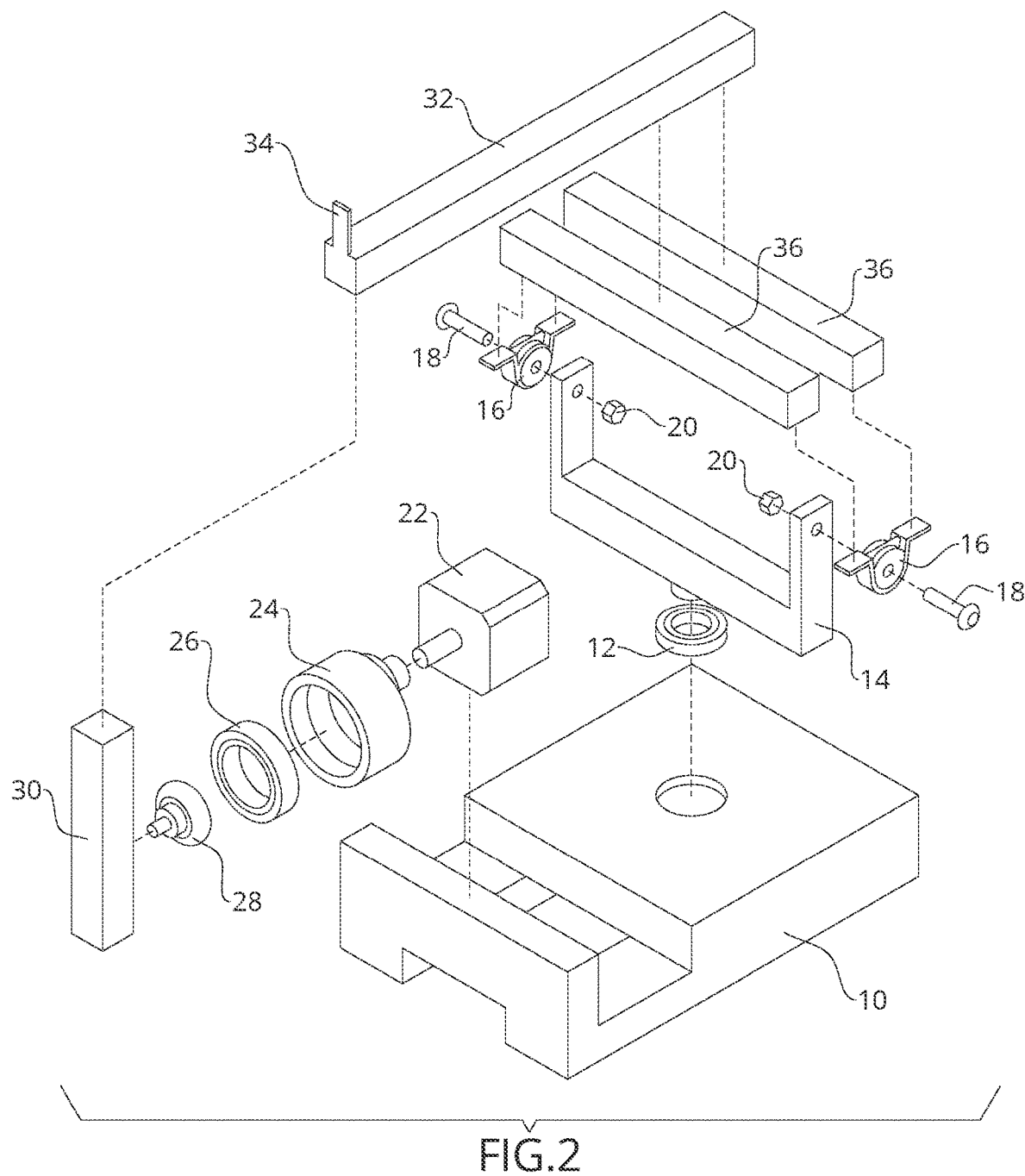
FIG. 2 depicts an exploded view of the system of FIG. 1 in accordance with embodiments of the invention.
Figure 3:
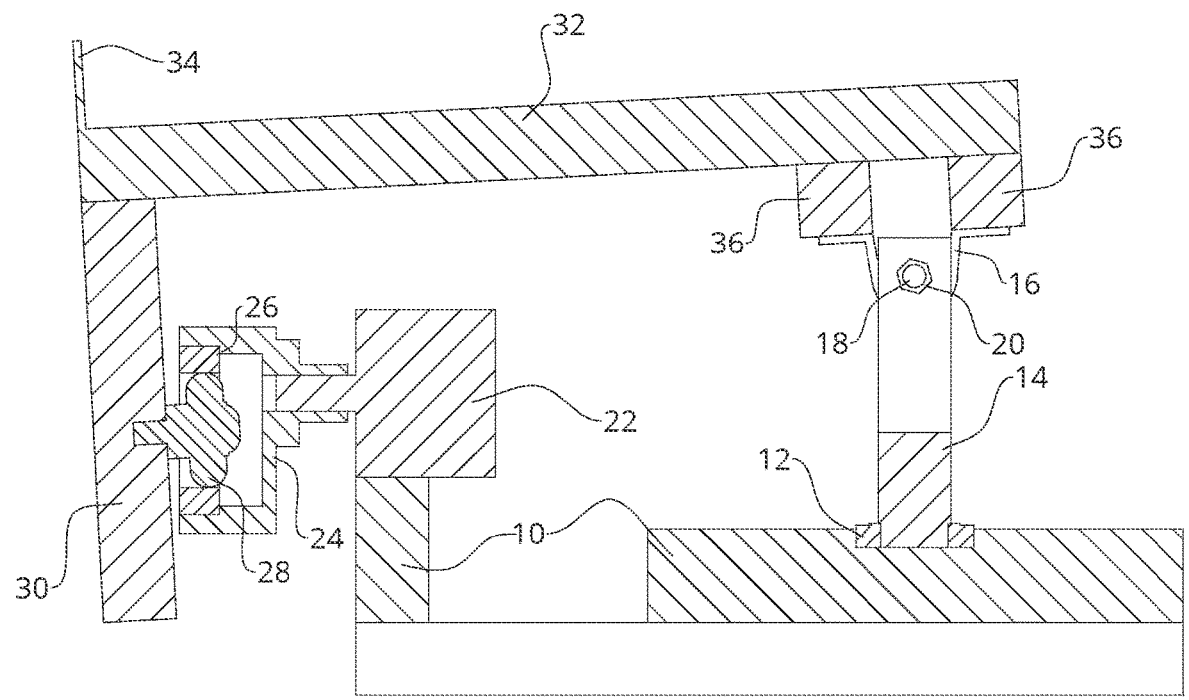
FIG. 3 depicts a section view of the system taken along line 3-3 in FIG. 1 in accordance with embodiments of the invention.
Figure 4:
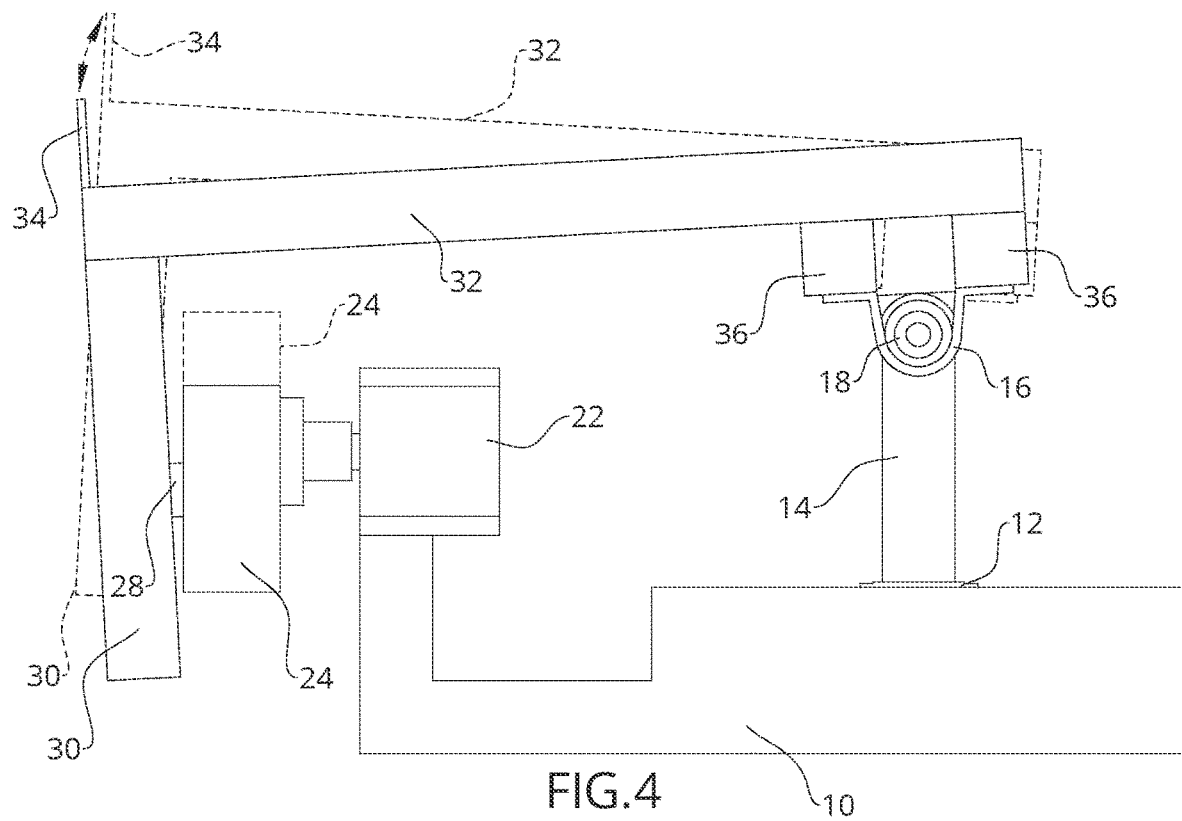
FIG. 4 depicts a side view of the system of FIG. 1 showing vertical movement in accordance with embodiments of the invention.
Figure 5:
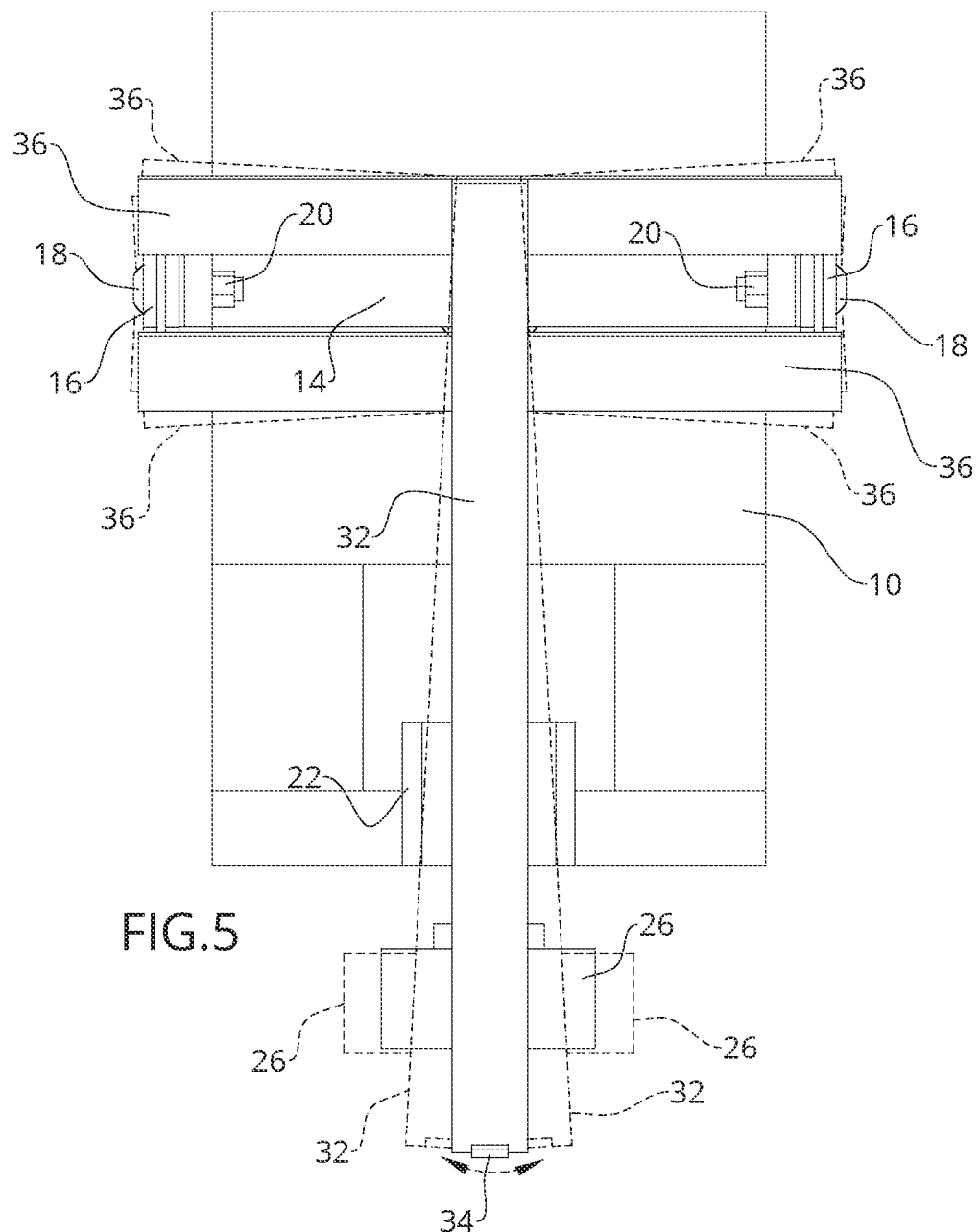
FIG. 5 depicts a top view of the system of FIG. 1 showing side-to-side movement in accordance with embodiments of the invention.

FIG. 1 depicts a perspective view of a system to move an object in a circle in accordance with embodiments of the invention. FIG. 1 will be described in conjunction with FIGS. 2-5. Specifically, FIG. 2 depicts an exploded view of the system of FIG. 1, and FIG. 3 depicts a section view of the system taken along line 3-3 in FIG. 1. Further, FIG. 4 depicts a side view of the system of FIG. 1 showing vertical movement, and FIG. 5 depicts a top view of the system of FIG. 1 showing side-to-side movement.

The system may be configured to enable an object to move in a circular motion (or in a circle) while keeping the object's vertical or upright position intact. Any object may be firmly fixed or attached to the system without any extra mechanical gear or motors. A user may simply screw or attach the object to the main axis of the system, and the system maintains the object's upright position while moving the object in a circle (in any direction, e.g., a clockwise direction or a counterclockwise direction). In some cases, the base may be fixed to a flat surface with two points of contact.

The system may include a base 10 on which a lower bearing 12 may be attached/affixed. In an exemplary aspect, the lower bearing 12 may be circular in shape. In some aspects, a bottom portion of the lower bearing 12 may be attached to the base 10, and a top portion of the lower bearing 12 may be attached to a yoke 14. The yoke 14 may have U-shaped structure (as shown in FIGS. 1 and 2), and a lower portion/part of the yoke 14 may be attached to the top portion of the lower bearing 12.

Left and right walls of the U-shaped yoke 14 may include or be attached with bearing yokes 16. In some aspects, the bearing yokes 16 may be disposed on the external surfaces of the left and right walls of the yoke 14. In the exemplary aspect depicted in FIG. 2, the bearing yokes 16 are attached to the left and right walls of the yoke 14 via bolts 18 and nuts 20. In some aspects, the nuts 20 may be disposed on the interior surfaces of the left and right walls of the yoke 14.

The system may further include a motor 22 that may be disposed on the base 10, at a predefined distance away from the yoke 14. The motor 22 may be any motor, e.g., a Direct Current (DC) motor, an Alternating Current (AC) motor, a stepper motor, a servo motor, etc. A proximal end of the motor 22 may include a protrusion into which an enclosure 24 may be inserted/attached. In some aspects, the enclosure 24 may be circular in shape, as depicted in FIGS. 1 and 2. A bearing wheel 28 may be attached to the enclosure 24 via an enclosure bearing 26. The distance therebetween may define a circular movement diameter. An up arm 30 may be attached to a proximal end of the bearing wheel 28. In the exemplary aspect depicted in FIGS. 1 and 2, the up arm 30 is shaped as an elongated cuboid.

In some aspects, a top portion of the up arm 30 may be attached to a proximal portion of a holding arm 32. The proximal portion of the holding arm 32 may further include an attachment point 34 to which an object to be moved in a circle may be attached. A distal portion of the holding arm 32 may be attached to the bearing yokes 16 (or the yoke 14) via cross bars 36, as shown in FIGS. 1-4. In some aspects, the cross bars 36 may be shaped as elongated cuboids.

The system may act as a reversed gyroscope. An upright object may be attached to the attachment point 34, which may be firmly attached to the holding arm 32. The holding arm 32 may act as a spinning axis (which may not spin). The holding arm 32 may just be an arm driven by the motor 22. Specifically, when the motor 22 is switched ON, the motor 22 rotates the bearing wheel 28, which causes the up arm 30 and the holding arm 32 to move in a circular motion, while the up arm 30 stays in the upright position. Since the up arm 30 stays in the upright position, the object attached to the attachment point 34 also stays in the upright position when the object moves in the circular motion.

In some aspects, an offset may exist between the centers of the rotating holding arm 32 (specifically the spinning axis or the longitudinal axis of the holding arm 32) and the motor axis. In some aspects, the offset may be the distance between the holding arm 32 (when the holding arm 32 may not be moving) and the motor axis (or the motor 22). The offset between the centers of the holding arm 32 (i.e., the spinning axis) and the motor axis together with the length of the holding arm 32/spinning axis defines the radius of the circular movement of the object. A person ordinarily skilled in the art may appreciate that like in gyroscope, all the three axes (spinning axis, horizontal axis and vertical axis) of the system must cross at a common center.

To make the system, an operator may first identify the required/desired radius of circular movement of the object. The operator may further identify a weight of an object (or weights of objects) to be moved in a circular motion. The operator may then accordingly identify a proper enclosure bearing 26 and bearing wheel 28. The operator may further calculate an optimal offset/distance between the spinning axis (i.e., the holding arm 32) and the motor axis, and calculate the length of the holding arm 32, to enable efficient circular movement of the object.

To operate the system, the operator may turn ON the system/motor 22. The system may further include a dial potentiometer, using which the operator may increase or decrease the speed of the circular movement of the object. The system may further include a stepper motor controller that may control the speed, direction and exact position of the object when the object moves in the circular motion. The system may additionally include a game controller that may enable the operator to remotely control the stepper motor.

The system, as disclosed in the present disclosure, may be used in a plurality of application areas or products. For example, the system may be used in a Ferris wheel, robotic eyes, power vibrator for a sex toy or a kitchen appliance, a pilot training cabin, a highest precision self-guided anti-aircraft gun using a stepper motor, and/or the like.

In some aspects, the bearings disclosed in the present disclosure may be self-aligning ball bearings.

Except as may be expressly otherwise indicated, the article "a" or "an" if and as used herein is not intended to limit, and should not be construed as limiting, the description or a claim to a single element to which the article refers. Rather, the article "a" or "an" if and as used herein is intended to cover one or more such elements, unless the text expressly indicates otherwise.

This invention is susceptible to considerable variation within the spirit and scope of the appended claims.

The claimed invention is:

1. A system to enable an object to move in a circular motion while keeping an upright position of the object intact, the system comprising:
   a base;
   a motor disposed on the base;
   an enclosure configured to be attached to the motor;
   a bearing wheel attached to the enclosure;
   an up arm attached to the bearing wheel; and
   a holding arm attached to the up arm, wherein the holding arm comprises an attachment point to which the object is configured to be attached, and
   wherein the motor is configured to move the object in the circular motion by causing the up arm and the holding arm to move in the circular motion when the motor is switched ON.

2. The system of claim 1, wherein a top portion of the up arm is attached to a proximal portion of the holding arm.

3. The system of claim 1, wherein the attachment point is disposed at a proximal portion of the holding arm.

4. The system of claim 1, further comprising a yoke and a lower bearing, wherein the yoke is attached to the base via the lower bearing.

5. The system of claim 4, wherein the yoke has a U-shaped structure.

6. The system of claim 4, further comprising one or more cross bars, wherein a distal portion of the holding arm is attached to the yoke via the one or more cross bars.

7. The system of claim 1, wherein the motor is disposed a predefined distance away from a longitudinal axis of the holding arm.

8. The system of claim 1, wherein the motor is at least one of a Direct Current (DC) motor, an Alternating Current (AC) motor, a stepper motor, and a servo motor.

9. A system to enable an object to move in a circular motion while keeping an upright position of the object intact, the system comprising:
   a base;
   a motor disposed on the base;
   an enclosure configured to be attached to the motor;
   a bearing wheel attached to the enclosure;
   an up arm attached to the bearing wheel; and
   a holding arm attached to the up arm, wherein:
      the holding arm comprises an attachment point to which the object is configured to be attached,
      the attachment point is disposed at a proximal portion of the holding arm,
      a top portion of the up arm is attached to the proximal portion of the holding arm, and
      the motor is configured to move the object in the circular motion by causing the up arm and the holding arm to move in the circular motion when the motor is switched ON.

10. The system of claim 9, further comprising a yoke and a lower bearing, wherein the yoke is attached to the base via the lower bearing.

* * * * *